United States Patent

[11] 3,569,834

[72] Inventor Hubert P. Debart
Meudon, France
[21] Appl. No. 646,072
[22] Filed June 14, 1967
[45] Patented Mar. 9, 1971
[73] Assignee Societe Anonyme Societe Alsacienne De Constructions Atomiques De Telecommunications Et D'Electronique
Paris, France
[32] Priority June 17, 1966
[33] France
[31] 66,017

[54] DELTA-MODULATED TRANSMISSION SYSTEM WITH PREDICTION OF VOICE DEVELOPMENT AND TRANSMISSION OF ONLY COORDINATION AND ERROR SIGNALS
2 Claims, 6 Drawing Figs.

[52] U.S. Cl. .......... 325/38, 179/15, 332/11
[51] Int. Cl. .......... H03k 13/22, H03j 3/04
[50] Field of Search .......... 325/38.1, 38; 179/15 (APC), 15 (BWR), 15.55; 332/11 (D), 11 (Inquired)

[56] References Cited
UNITED STATES PATENTS

| | | | |
|---|---|---|---|
| 2,732,424 | 1/1956 | Oliver | 179/15.55 |
| 3,026,375 | 3/1962 | Graham | 325/38(.1) |
| 3,393,364 | 7/1968 | Fine | 325/38(.1) |

*Primary Examiner*—Robert L. Griffin
*Assistant Examiner*—James A. Brodsky
*Attorney*—Littlepage, Quaintance, Wray & Aisenberg

ABSTRACT: The invention concerns a method for reducing the bandwidth in a delta-modulated transmission system which consists in setting up a prediction table of future pulses, base upon the last pulses of the delta-modulated train of pulses, in setting up simultaneously at the transmission and at the reception ends, a second train of pulses of the same repetition rate as the first train, in feeding the receiver with an error signal each time the concordance between the predicted pulse and the corresponding delta pulse is not realized, in correcting consequently the train of pulses built at the receiving end for building up with accuracy the initial train of delta pulses and finally in deducing from it the signal, for example a vocal one.

Hubert P. Debart
Inventor
By Littlepage, Quaintance & Wray
Attys

Hubert P. Debart
Inventor
By Littlepage, Quaintance & Wray
Attys

DELTA-MODULATED TRANSMISSION SYSTEM WITH PREDICTION OF VOICE DEVELOPMENT AND TRANSMISSION OF ONLY COORDINATION AND ERROR SIGNALS

This invention concerns a method for reducing the bandwidth in a delta-modulated transmission system.

It is already known that the transmission by delta-modulation consists in analyzing the signal to be transmitted, for instance speech, by sampling at a frequency definitely higher than the one of the signal to be transmitted which is for instance 70 *kc/s* in presence of a vocal signal. This transmission mode consists more particularly in comparing, at every sampling moment, the actual value of the voice development signal with the predicted value reached by the procedure of this invention. Any difference in the actual voice development signal and the predicted signal is converted to a binary code. A 1 pulse is produced if the predicted voltage development is erroneous and a 0 pulse if the predicted and actual voltage development agree.

The transmitting system which supplies a binary coding of the signal to be transmitted, includes a pulse generator operating at the sampling frequency, the pulses of which are fed to a pulse modulator controlled by a comparator circuit which converts into binary code the sign of a difference between the actual sampling value and the predicted value. At the modulator output, a series of binary-coded pulses is obtained, which represents the signal to be transmitted.

The receiver comprises only an integrator circuit and a lowpass filter which combine the predicted staircase voltage and the error signals to reconstitute the actual staircase voice voltage. The number of information bits thus transmitted by such a delta-modulated transmission system remains low in view of the high number of information bits required in the voice voltage reconstituting pulses. If five successive pulses are supposed to be 1, indicating thus a prolongated growing of the voltage, there is a much higher probability for the sixth pulse for being still a 1 than for being a 0. This fact can be easily explained if it is taken into consideration that in a random process, it is possible to predict the signal to come according to a time interval of the order of the shortest period contained into the process spectrum. In the delta-modulated transmission system, the analysis repetition period is low compared with the shortest period which can assume the signal to be analyzed; several successive pulses depend in reality statistically on each other. The frequency bandwidth used is too high relative to the number of informations that actually have to be transmitted. Different means have already been proposed for improving analysis and reproduction of the signal but they have not allowed the applied bandwidth to be decreased. Using a delta-modulated code transmission system, the present invention greatly reduces the amount of information bits which must be transmitted. Consequently, many transmissions of voice voltages or the like may be made simultaneously within a single bandwidth. Previously that bandwidth would have been used for the transmission of a single delta-modulated signal.

An other object of the invention is also to decrease the bandwidth necessary for the simultaneous transmission of several delta-modulated transmission channels.

The basic principle of the invention is that the encountered difficulties can be met by taking into account the statistical correlation between successive pulses such as explained hereabove, for setting up a prediction of the signal. The predicted signal is simultaneously built by the transmitter and the receiver, and the voice signal is reconstructed on the receivers side by transmitting an error signal each time the foresaid prediction does not come true.

The improvements brought according to the invention decrease the number of informations or the quantity of information to be transmitted in a delta-modulated train of pulses, consist essentially in setting up a prediction table of future pulses, based upon the last pulses of the delta-modulated train of pulses, in setting up simultaneously at the transmission and at the reception ends, a second train of pulses of the same repetition rate as the first train, in feeding the receiver with an error signal each time the concordance between the predicted pulse and the corresponding delta pulse is not realized, in correcting consequently the train of pulses built at the receiving end for building up with accuracy the initial train of delta pulses and finally in deducing from it the signal, for example a vocal one.

According to a particular embodiment of the invention, the prediction table of the future pulses is based upon the three last pulses. In FIG. 1 of the appended drawings can be seen the first train (or initial train of delta pulses), the second and the third train of pulses applied in the process according to the invention:

The second train of pulses is set up simultaneously at the transmission and at the reception ends, starting by example from the three last pulses of the initial train of delta pulses. By consulting the undermentioned prediction table, one intuitively sees that, with the three last pulses being 0, it would be normal to predict that the pulse to come would also be 0. In the same manner, if the two first pulses are 0 and if the third one is not 0, one can still predict that the increasing will go on and one can still predict a pulse 1, etc. However, some cases can happen where the intuitive reasoning does not lead to satisfactory results. The inventor has carried out an important statistical testing research which led him to set up the undermentioned prediction table, in the case one starts from the three last pulses of the initial train of delta pulses:

| Prediction basis | | | Predicted pulse |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

The third train of pulses is built at the emitter (transmission end), one pulse after the other, by comparing the new pulse of the delta train and the realized prediction. In case of concordance, the transmitter gives a 0, but if the prediction is false, the transmitter gives an error signal which can assume the form of a 1 pulse, as it can be seen at the FIG. 1.

With regards to the transformation at the reception end of the third train (error signals) into the initial delta train, it can be effected without any difficulties when at a given moment a known group of three consecutive pulses from the first train are available. According to the invention, one replaces for this purpose, at regular intervals, three successive pulses from the first train by a given group, known beforehand, for example 0 0 0. Starting from this basis, it is an easy matter to reconstitute the prediction train (second train) and thus the initial train of delta pulses.

The essential advantage given by the improvements which are the object of the invention can be seen immediately when one considers that, into the initial system of delta pulses, the number of 1 and 0 transmitted is statistically balanced in an accurate manner and that the same is true into the prediction train. On the contrary, into the train of error signals transmitted to the receiver, the number of 1 pulses corresponding to the error signal is much lower than the number 1 pulses in the initial voice train and in the prediction train. As an example, if the number of 1 pulses which is one half of the total pulses in the initial train is to be decreased by a ratio of 1 to 4 in comparison with the initial train, the probability of happening of 1 becomes one-eighth and the probability of happening of 0 becomes seven-eighths.

If $N$ represents the repetition rate of the pulses, the number of informations transmitted is expressed by $$N\,[\tfrac{1}{8}\log 2\,\tfrac{1}{8} + \tfrac{7}{8}\log 2\,\tfrac{7}{8}]$$

bits per second; this means that the number of informations transmitted is approximately $N$12 bits/ second, and that it is reduced by half. The remaining part of the bandwidth can be used for transmitting other compatible informations. If $P$ delta channels are taken into consideration, a number of active channels lower than $P/2$ will only be present in the sampling and, the probability of happening of 1 pulses in a channel being here of one-eighth, the average number $n$ of 1 signals, i.e. the basis of the transmission capacity ($n = P \times ½ \times ⅛$) is thus much lower than the $P$ number of channels. According to the invention one limits this transmission capacity to $Kn$ signals 1 by sampling sequence by choosing $K$ in such a manner that the probability of having the number of 1 signals by sampling sequence exceed $Kn$ is lower than a given value.

A description of an embodiment of the said process has been given hereunder, with reference to the FIGS. 2 and 3 of the drawings. It provides a beam of $P$ delta channels of the order of several hundreds for example. At both ends equipments are made of standard logic circuits where the signal prediction is simultaneously set up at the transmission and at the reception ends for each channel. The transmission is limited to the sending of a signal error every time the prediction comes false for one channel, this error signal being set up by an indication of the rank of the corresponding channel. It is necessary, however, to transmit at regular intervals, for instance every thousand pulses, a control signal indicating that, at that very moment, a group of pulses, three for example, set beforehand in order to check the elaboration of the receiver predictions, is being transmitted. In an example of particular embodiment this group of pulses is generated by a generator fitted into the receiving equipment at the arrival of the synchronizing channel. In the drawings:

The simultaneous description of the arrangement and of its working, will make easier the understanding of this device and the bandwidth reduction thus obtained.

Figure 1:
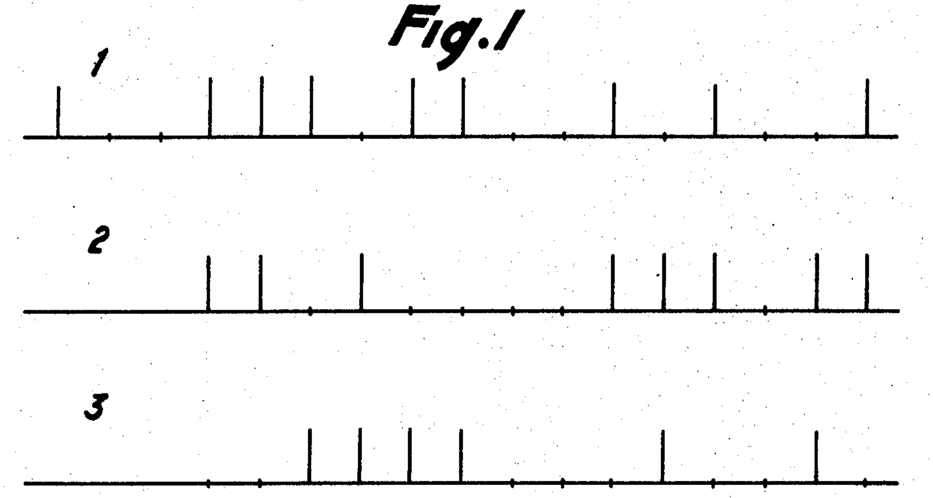
FIG. 1 illustrates three pulse trains: the original pulse train, the prediction train, and the error train, respectively.
Figure 2:
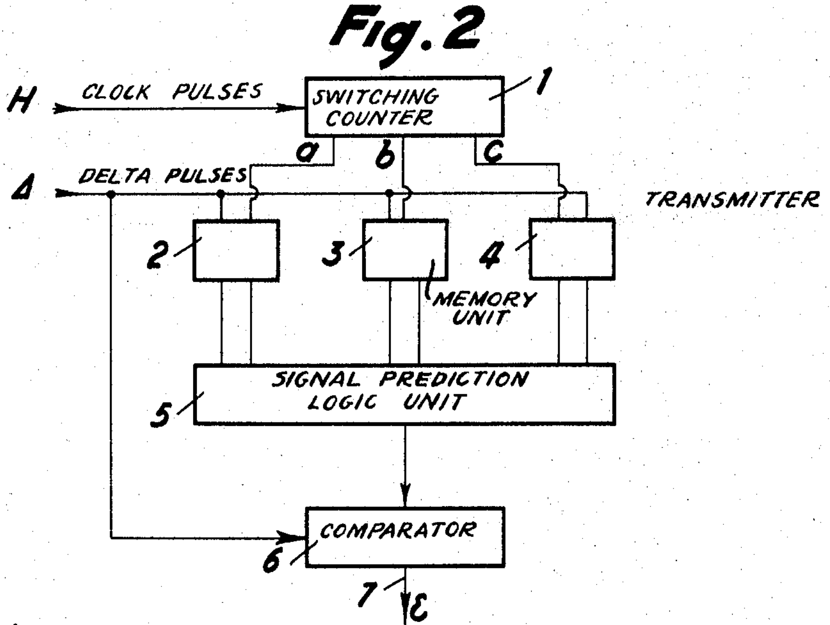
FIG. 2 illustrates the block diagram at the transmission end.

The block diagram illustrated at FIG. 2 is made exclusively of standard logic circuits mass-produced on printed circuit cards according to a method well known in the art. The cards are then interconnected by pins.

At the transmission end (FIG. 2), the synchronization is applied to the delta train by a switching counter 1. The three successive pulses are memorized by shift-registers memory units 2,3, and 4 which transfer the pulses into the signal prediction logic unit 5. The output of this unit 5 is compared in the logic comparator circuit 6 with the train directly issued from the delta-modulated signal. The train of pulses which results corresponds to the error signal $\epsilon$ going out a 7. The transmission of the error signal can then be made in the following manner: the figure of the channels on which a 1 appears is transmitted in binary code.

Figure 3:
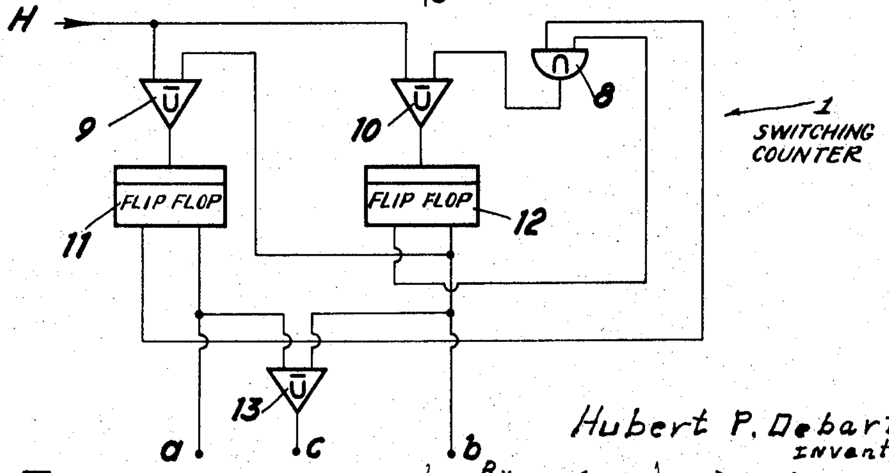
FIG. 3 represents the switching counter.

The switching counter 1, as shown in detail in FIG. 3, is controlled by a clock H. Switching counter 1 allows resolving three successive instants of the signal. It consists of an AND gate 8 (FIG. 3) three OR inverted circuits 9, 10 and 13 and two flip-flops 11 and 12. The first signal enters simultaneously the flip-flops 11 and 12. The flip-flops 11 switches to the other state, while the flip-flop 12 does not, as it receives on the one side the direct pulse and on the other side the pulse passing through the flip-flop 11. At the second clock signal, the flip-flop 11 remains in its original state, while the flip-flop 12 switches to the other state until the third clock signal, where it recovers its initial state. At the third clock-signal, the flip-flop 11 switches again, and so on. At the $a$ and $b$ outputs appear two stepped voltages with a sampling-period shift between each other. These two voltages, combined into an inverted OR circuit 13 give back a third step $c$, with a shift of a new sampling period.

The parallel-access memory unit 2, 3 and 4 controlled by the switching counter records at every sampling sequence the succession of the three last moments of the delta train. It consists essentially in three flip-flops to which come on the one side the signal issued from the switching counter and on the other side the train of delta pulses.

The parallel-access memory unit can be replaced by a series-access shift register. In this case, the delta pulses act successively upon the state of the three flip-flops controlled also by a signal generated from the clock-signal.

Figure 4:
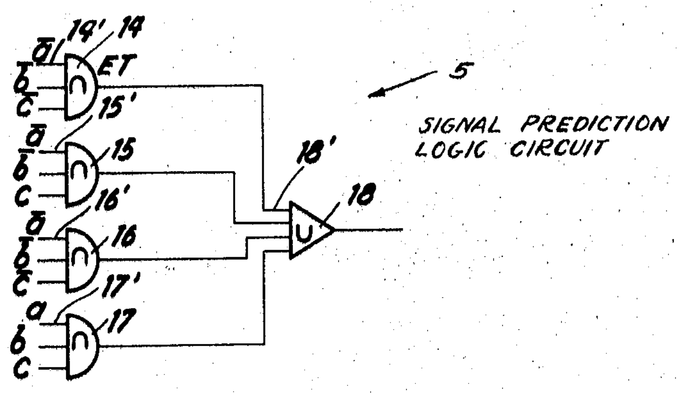
FIG. 4 illustrates a particular mode of realization of the logic block (signal prediction)

The logic unit 5, shown in detail in FIG. 4 receives the pulses coming from the flip-flops of the memory unit and generates a prediction signal. It consists essentially in a system of multiple-input AND gate 14, 15, 16 and 17 and an OR circuit 18.

In the embodiment where a pulse is predicted from the three preceeding pulses, the prediction table is compiled by setting up the logic circuit corresponding to the relation:

$p = a\bar{b}\bar{c} + \bar{a}b\bar{c} + \bar{a}\bar{b}c + abc$ where $a$, $b$, and c, are the three successive pulses and $p$ the predicted pulse. This diagram can be very easily realized (FIG. 4) with four three-input AND circuits 14, 15, 16 and 17 and one four-input OR circuit 18.

Figure 5:
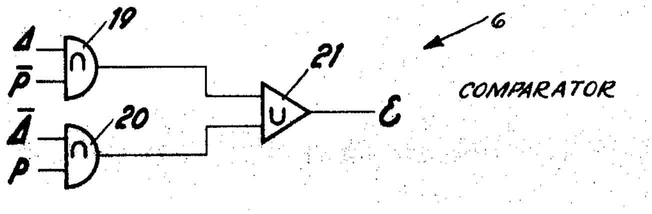
FIG. 5 represents the comparator circuit.

The comparator 6, which is shown in detail in FIG. 5 compares the predicted signal with the delta signal. It generates the function $\epsilon$ corresponding to the error signal:

$\epsilon = \Delta\bar{p} + \Delta\bar{p}$ It is very easily constructed with two AND gates 19 and 20 and one OR circuit 21. The train $\epsilon$ thus obtained has the same repetition rate than as the initial delta train.

Figure 6:
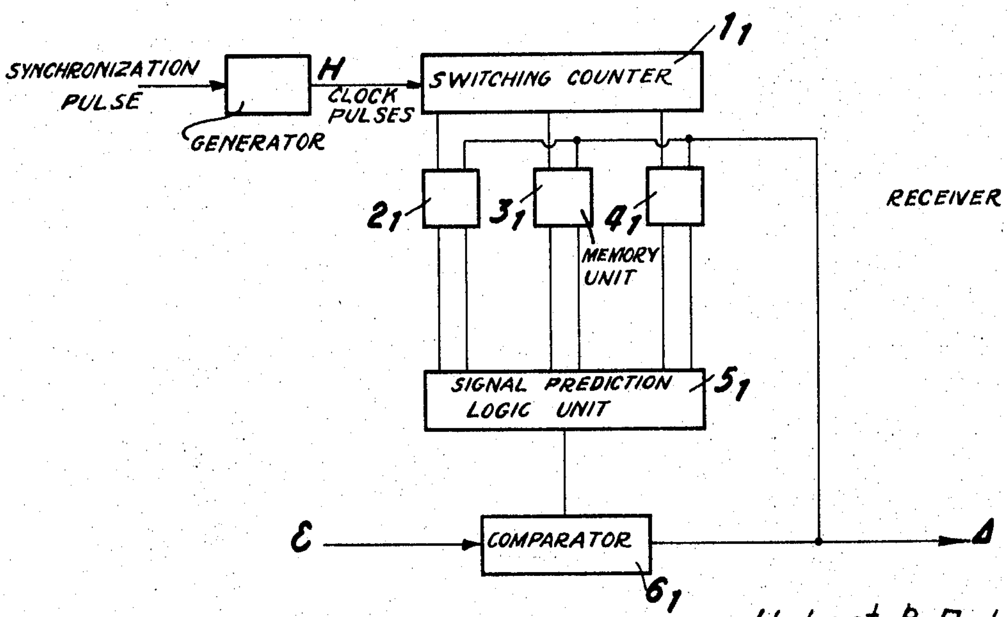
FIG. 6 illustrates the block diagram at the reception end.

Reception, as shown in FIG. 6, is carried out exactly along the same processes and with the same elements, the references of which receive the sub-index 1, taking into account the fact that the synchronization signal regenerates the predetermined clock signal through a generator. The $\Delta$ regenerated signal is then converted into a vocal signal, for instance, by any known means.

It can be seen that, in the illustrated arrangement, although the $P$ channels are sampled in synchronism, the average number of 1 pulses which appears upon the total $P$ channels is far lower than this same number $P$ of channels: in fact the number of active channels is $P \cdot p$, where $p < ½$ because, even when all connections are active, there is only one active direction at the same time for one individual connection, according to the principle applied in particular with the transoceanic communications between Europe and the U.S. Per channel the average number of 1 pulses is $g$, where $g$ is the reduction of the number of 1 e.g., $g = ¼$. The average number of 1 is thus:

$n = P p g$ $n << P$

One limits the transmission capacity to $Kn$ 1 per sampling period. The number $K$ is selected in such a manner that the probability of having the number of simultaneous 1 exceed $Kn$ is lower than a given number.

For example, for a 512 channels unit ($= 2^9$), $Kn = 30$ can be selected. The transmission needs $30 \times 9 = 270$ bits per sampling sequenced instead of 512. A very noticeable gain is thus obtained for signals transmitted per second, as well as an important decrease of the applied bandwidth.

I claim:

1. A system for transmitting information by using coded binary pulses, consisting of an emitting station, a transmission circuit and a receiving station;

at the emitting station, a source of information signal providing an analogue signal represented by a voltage, a device emitting synchronizing signals, a delta-modulated binary coder with an input for the analogue signal and an output, means in said coder to sample with a determined period of repetition the instantaneous amplitude of said analogue signal and to obtain a series of coded pulses each having one of the values 1 and 0 depending upon the differences between a sampled amplitude and the amplitude of a signal provided from the pulse previously generated from the said series, first preserving means to preserve for a predetermined time each group of $m$ successive coded pulses pertaining to said series, a logic predicting circuit having a number of inputs corresponding to the number $m$ of said group to receive simultaneously said preserved group of pulses and having an output, means in said predicting circuit to feed the output with a resulting predicted binary coded pulse of a value depending on the composition of said group, a comparing device with a first input and a second input and with an output, the said predicted pulse being applied to said first input at the same time that the pulse immediately following said group is applied to said second input, whereby the said output of the comparing device produces one of two binary error pulses having either the value 1 when the two last pulses simultaneously applied to the comparing device are different or the value 0 when said two last pulses are identical, and means to connect the output of the comparing device to the transmission circuit;

at the receiving station, a second comparing device identical with the comparing device of the emitting station and having a first input and a second input and an output, the transmission circuit connected to the said first input of said second comparing device, a second predicting logic circuit identical with the predicting circuit of the emitting station, pulses generated by said second predicting circuit being fed to the second input of the second comparing device, means in said second comparing device to reconstitute from the pulses entered therein, a series of pulses, at the output of the second comparing device second preserving means to preserve each group of $m$ pulses of said reconstituted series for a predetermined time, the second predicting logic circuit having a number of inputs corresponding to the number $m$ of said group, connections between outputs of the second preserving means to the respective inputs of said second predicting circuit to simultaneously feed said preserved pulses to said latter respective inputs;

and means connected to the second comparing device output to reconstitute the analogue information transmitted.

2. A system according to claim 1 in which the first and second preserving means consist of a memory-block with parallel access, and a switching counter to control said block.